US008856221B2

(12) United States Patent
Rothschild (10) Patent No.: US 8,856,221 B2
(45) Date of Patent: Oct. 7, 2014

(54) SYSTEM AND METHOD FOR STORING BROADCAST CONTENT IN A CLOUD-BASED COMPUTING ENVIRONMENT (71) Applicant: Leigh M. Rothschild, Sunny Isles Beach, FL (US)

(72) Inventor: Leigh M. Rothschild, Sunny Isles Beach, FL (US)

( * ) Notice: Subject to any disclaimer, the term of this patent is extended or adjusted under 35 U.S.C. 154(b) by 0 days.

(21) Appl. No.: 13/652,034

(22) Filed: Oct. 15, 2012

(65) Prior Publication Data

US 2013/0054683 A1 Feb. 28, 2013

Related U.S. Application Data (63) Continuation of application No. 13/300,798, filed on Nov. 21, 2011, now Pat. No. 8,307,089.

(60) Provisional application No. 61/528,543, filed on Aug. 29, 2011.

(51) Int. Cl.
*G06F 15/16* (2006.01)
(52) U.S. Cl.
USPC ........... 709/203; 709/204; 709/231; 709/226; 709/249
(58) Field of Classification Search
USPC ........................................ 709/203
See application file for complete search history.

(56) References Cited

U.S. PATENT DOCUMENTS

| | | | |
|---|---|---|---|
| 6,822,639 B1 | 11/2004 | Silverbrook et al. |
| 7,496,608 B2 | 2/2009 | Wilbrink et al. |
| 8,108,441 B2 | 1/2012 | Ruhlen |
| 2002/0069252 A1 | 6/2002 | Jones et al. |
| 2003/0014630 A1 | 1/2003 | Spencer et al. |
| 2003/0060264 A1 | 3/2003 | Chilton et al. |
| 2003/0061281 A1 | 3/2003 | Miyazaki |
| 2005/0021869 A1 | 1/2005 | Aultman et al. |
| 2005/0076220 A1 | 4/2005 | Zhang et al. |
| 2006/0080452 A1 | 4/2006 | Julia et al. |
| 2010/0217759 A1 | 8/2010 | Ma et al. |
| 2010/0223385 A1 | 9/2010 | Gulley et al. |
| 2010/0268736 A1 | 10/2010 | Ruhlen |
| 2010/0332456 A1 | 12/2010 | Prahlad et al. |
| 2011/0066687 A1 | 3/2011 | Chen et al. |

*Primary Examiner* — Hua Fan
(74) *Attorney, Agent, or Firm* — Atanu Das; Techlaw LLP (57) ABSTRACT

A system, method and device for media content storage and delivery. A server has a receiver in communication with a processor. The receiver receives a request message. The request message includes media data indicating requested media content and a consumer device identifier corresponding to a consumer device. The processor determines whether the consumer device identifier corresponds to a registered consumer device. If the processor determines that the consumer device identifier corresponds to the registered consumer device, then the processor determines whether the request message is one of a storage request message and a content request message. If the request message is the storage request message, then the processor is further configured to determine whether the requested media content is available for storage. If the request message is the content request message, then the processor initiates delivery of the requested media content to the consumer device.

13 Claims, 7 Drawing Sheets

SYSTEM AND METHOD FOR STORING BROADCAST CONTENT IN A CLOUD-BASED COMPUTING ENVIRONMENT

CROSS-REFERENCE TO RELATED APPLICATION

This application is a continuation of U.S. patent application Ser. No. 13/300,798, filed Nov. 21, 2011, entitled SYSTEM AND METHOD FOR STORING BROADCAST CONTENT IN A CLOUD-BASED COMPUTING ENVIRONMENT, which is related to and claims priority to U.S. Provisional Patent Application Ser. No. 61/528,543, filed Aug. 29, 2011, entitled SYSTEM AND METHOD FOR STORING BROADCAST CONTENT AT A REMOTE SERVER LOCATION the entirety of all of which is incorporated herein by reference

STATEMENT REGARDING FEDERALLY SPONSORED RESEARCH OR DEVELOPMENT n/a

FIELD OF THE INVENTION

The present invention relates to a method and system for on-demand storage and delivery of media content.

BACKGROUND OF THE INVENTION

The widespread growth of communication networks and internet enabled consumer devices allow consumers to stream on-demand videos and music. The on-demand video and music service is typically provided by large companies or second party distributors that store the media content for streaming to the consumer devices. For example, a television company may maintain a television server that stores all television shows that are broadcast by the television company such that the consumer may stream the stored television show on the consumer device. This requires the television company to store all or substantially all the shows broadcast by the television company, which requires a great deal of data storage and often comes at a significant cost to the television company. The cost of storing all the broadcast shows is typically passed on to the consumer using the on-demand service such that the consumer ends up paying for storage of videos and music that the consumer has no interest in streaming.

In particular, the consumer may be charged a flat rate monthly subscription fee by the television company. For example, the consumer may be charged a ten dollar fee per month for streaming videos from the television server. The flat rate subscription fee may not change irrespective of whether the consumer streams hundreds of videos a month or one video a month. Consumers that vary the amount of content that is streamed monthly may end up paying more money for the service than if they simply bought the video content on digital versatile disk (DVD).

Some television companies and second party video and music distributors offer a flat rate per video or show that is streamed. In particular, a consumer may be charged a set fee for streaming a specific episode of a television program. For example, the consumer may be charged five dollars for streaming a two hour long episode of a television show to their consumer device. However, another consumer will be charged the same five dollar flat rate for streaming a fifteen minute episode of another television show. The flat rate fee associated with a specific video or show that a consumer wants to stream may end up detracting consumers who do not always stream long running episodes of television shows.

Moreover, consumers may want to stream videos of a particular program that may not be currently stored in the television server. The consumer may request the program in order for the television server to be updated to store the particular program but such a request may take weeks to months to fulfill. As such, the consumer may end up losing interest in the particular program, and the television server may eventually end up being updated with a particular video that no consumers stream, thereby unnecessarily expending data resources and driving up the cost of the streaming service.

There is a need in the art for an on-demand media storage and streaming system that tailors cost to each consumer based on the requested media content and each consumer's needs.

SUMMARY OF THE INVENTION

The present invention advantageously provides a method and system for on-demand storage and delivery of media content.

According to one embodiment, a system for media content storage and delivery is provided. The system includes a server that has a receiver and a processor. The receiver receives media data that indicates media content to be stored. The processor is in communication with the receiver. The processor determines media content characteristics that correspond to the media content to be stored. The processor determines a length of time to store the media content based on the media data and determines a cost amount based at least in part on the determined media content characteristics and length of time to store the media content.

According to another embodiment, a consumer device is provided. The consumer device includes a transmitter that transmits a storage request message. The storage request message indicates media content to be stored and the length of time the media content is to be stored. The consumer device includes a receiver that receives a confirmation message. The confirmation message indicates the media content is stored at the server based at least in part on the storage request message.

According to yet another embodiment, a method is provided for storing and delivering on-demand media content. The method includes receiving media data indicating media content to be stored. The method includes determining media content characteristics that corresponds to the media content to be stored. The method includes determining a length of time to store the media content based on the media data. The method includes determining a cost amount based at least in part on the determined media content characteristics and length of time.

According to yet another embodiment, a system is provided for storing and delivering media content. The system includes at least one server. The at least one server includes a memory that stores media content and a processor. The processor determines media content is available for download, determines the media content is not stored in memory and initiates download of the media content. The at least one server includes a receiver that receives the media content. The memory stores the received media content.

According to yet another embodiment, a method is provided for storing and delivering media content. A determination is made that media content is available for download. A determination is made that content is not stored. Download of the media content is initiated. The media content is received. The received media content is stored.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present invention advantageously provides a system and method for on-demand storage and streaming of media content. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Figure 1:
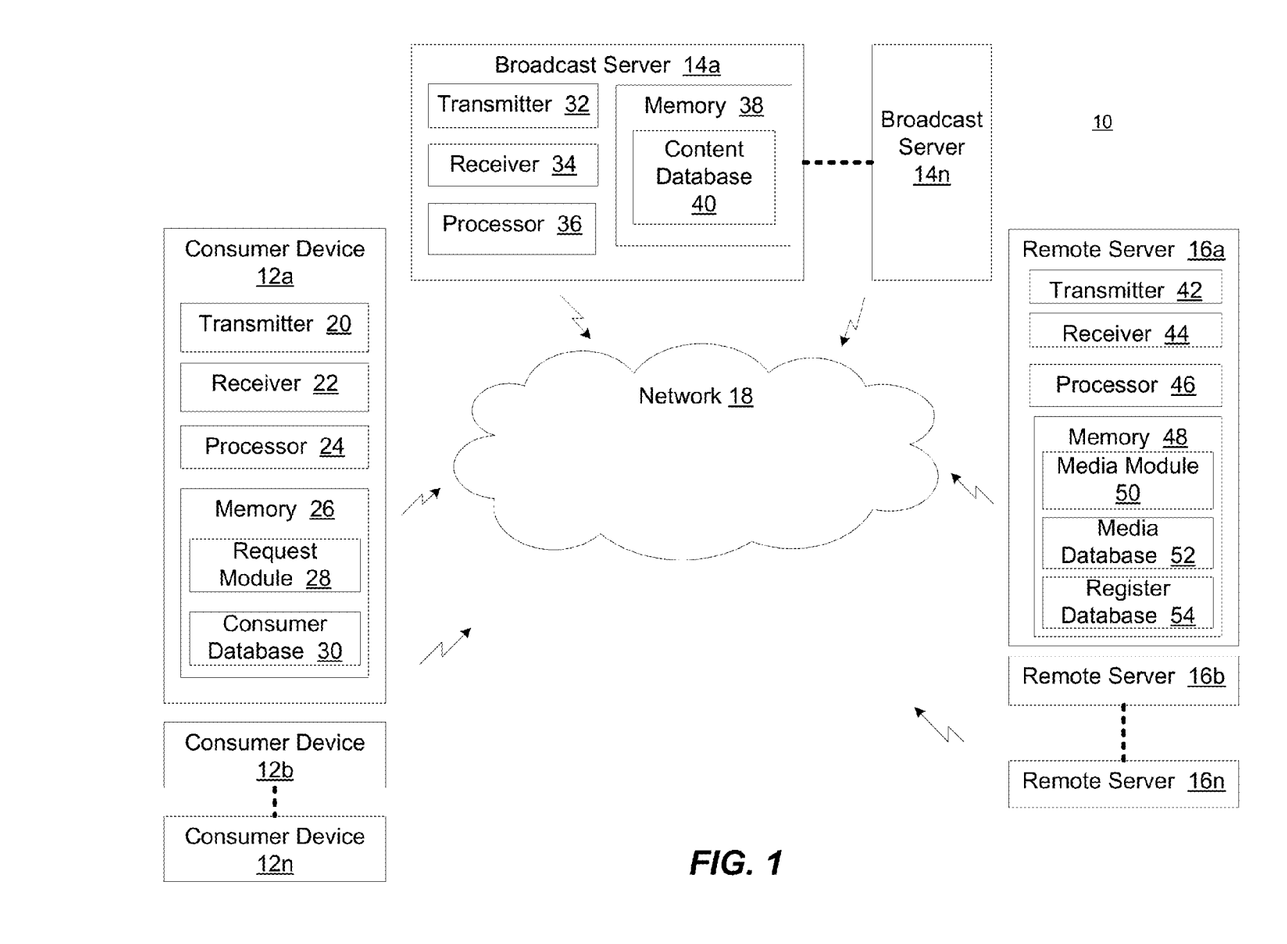
FIG. 1 is a block diagram of media content on-demand storage system constructed in accordance with the principles of the present invention.

Referring now to the drawing figures in which like reference designators refer to like elements there is shown in FIG. 1 an exemplary storage and streaming system constructed in accordance with the principles of the present invention and designated generally as "10." In particular, system 10 may include one or more consumer devices 12a to 12n (collectively referred to as "consumer device 12"), one or more broadcast servers 14a to 14n (collectively referred to as "broadcast server 14") and one or more remote servers 16a to 16n (collectively referred to as "remote server 16"), communicating via network 18 using communication protocols known in the art, e.g., Internet Protocol. Also, broadcast server 14 and/or remote server 16 may be part of network 18, a second network, among other network, e.g., each may form or be part of a cloud computing environment (not shown).

Consumer device 12 may include wired or wireless devices such as mobile phones, personal digital assistant devices, personal computers, laptop computers, tablet computers, digital video recorders, televisions, digital versatile disc players, among other devices that may communicate via network 18. Consumer device 12 may communicate with network 18 using communication protocols known in the art. In particular, consumer device 12 may include transmitter 20 and receiver 22 for transmission and reception of data communications over network 18. Processor 24 may include a central processing unit (CPU) for executing computer program instructions stored in memory 26, as is well known in the art.

Memory 26 may include non-volatile and volatile memory. For example, non-volatile memory may include a hard drive, memory stick, flash memory and the like. Also, volatile memory may include random access memory and others known in the art. Memory 26 may also include request module 28 and consumer database 30. Request module 28 includes instructions, which when executed by processor 24, causes processor 24 to perform the processes described herein, such as the request process for consumer device 12, discussed in detail with reference to FIG. 3.

Consumer database 30 may store consumer device data, consumer data and subscription data, among other data. Consumer device data may include a device identification number, model number and operating system, among other device information corresponding to the user of the consumer device. Consumer data may include consumer information such as addresses, phone numbers, financial institution information and credit/debit card information, among other consumer information. Subscription data may include subscription identification number and content storage and retrieval cost, as discussed in detail with respect to FIG. 4, among other subscription information.

Broadcast server 14 may include a transmitter 32, receiver 34, processor 36 and memory 38 as with the corresponding consumer device 12 components, with size and performance being adjusted based on design needs. Processor 36 performs functions described herein with respect to broadcast server 14. Broadcast server 14 may communicate with consumer device 12 and/or remote server 16, via network 18. Memory 38 may include content database 40 that stores/records media content, media content characteristics, among other data. For example, the stored media content may be video, audio, graphical images and the like, and the media content characteristics may be media runtime (playback time) of the media content, data size of media content, media content availability, media content existence and the like. Media content availability may indicate whether the media content is available for download, e.g., due to restrictions on the media content. Media content existence may indicate whether the media content exist, e.g., media content not found because user input the wrong movie title.

Remote server 16 may include transmitter 42, receiver 44, processor 46 and memory 48 as with the corresponding consumer device 12 components, with size and performance being adjusted based on design needs. Processor 46 may perform functions described herein with respect to remote server 16. Memory 48 may include media module 50, media database 52 and registration database 54. In particular, media module 50 may be computer program instructions, which when executed by processor 46, perform the storage and streaming processes as discussed with respect to FIG. 2. Media database 52 may store media content and media content characteristics similar to that stored in content database 40. The media database may store the media content for a specific length of time, as discussed with reference to FIG. 2. Registration database 54 may store account data corresponding to one or more consumer devices 12 such as user registration data, account information, number of consumer devices registered to a particular user, user account preferences, among other user account data. Alternatively, remote server 16 may be part of a server farm in which the server farm stores all available media content, as is discussed in detail with respect to FIGS. 5-6.

Figure 2:
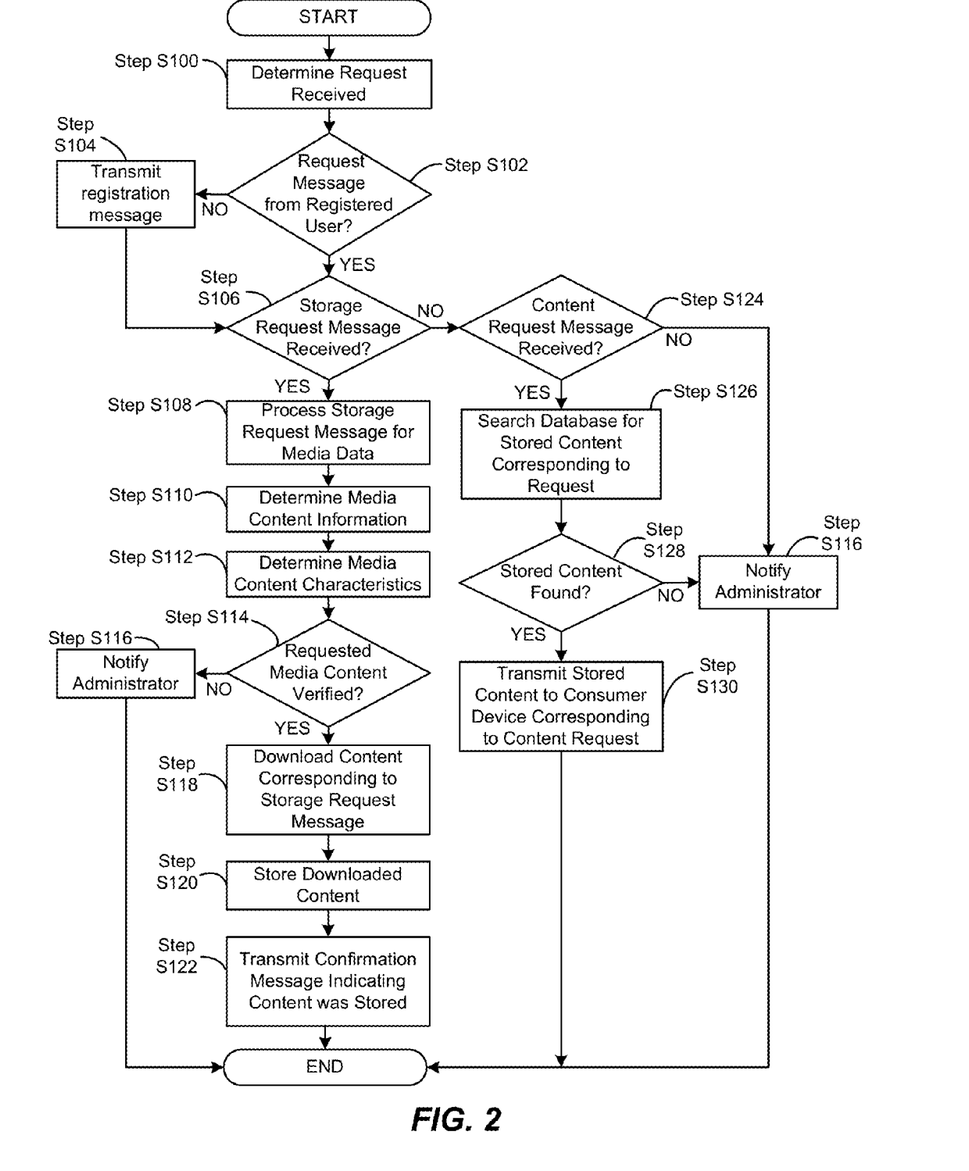
FIG. 2 is a flow chart of an exemplary process for processing a request message for initiating storing and streaming of media content.

An exemplary process for processing a request message to initiating storing and/or streaming is described with reference to FIG. 2. A list of media content may be provided to the consumer and displayed on consumer device display, e.g., via a website displayed in a web browser. The list of media may include content stored in media database 52 and content not stored in media database 52. Consumer device may request content from the list or may request non-listed media content. Consumer device 12 initiates the process by transmitting a request message to remote server 16 such that remote server 16 determines that a request message is received (Step S100). Remote server 16 determines whether the request message is received from a registered user, e.g., received from registered consumer device (Step S102). For example, the request message may include consumer data, device identification number(s), media data, among other data stored in consumer database 30 that corresponds to the specific user and/or consumer device. If the request message is determined to be from a non-registered consumer device, a registration message may be sent to the consumer device to prompt the user to register the consumer device 12 with remote server 16 (Step S104). Once the consumer device is registered, the process may continue to Step S106.

If the request message is determined to be from a registered consumer device, remote server 16 processes the request message to determine whether the request message is a storage request message (Step S106). In particular, the storage request message may include media data indicating the consumer device is requesting that remote server 16 store specific media content for an amount of time, e.g., the storage request message may have a triggering flag. If the request message is a storage request message, the media data in the storage request message is processed (Step S108). For example, the storage request message may contain media data identifying to the requested media content to be stored. The media data may include time data that indicates the length of time the user wants the media content to be stored. The time data may include a start-end date, period of time (e.g., one month, one week), end date, among other values and/or characters that may indicate a length of time. Remote server 16 may determine media content information based on the processed storage request message, e.g., based on the media data (Step S110). The media content information may include a media title, media content serial number, or other media identifying characters corresponding to the requested media content.

Remote server 16 may determine the media content characteristics corresponding to the requested content based on the media content information, e.g., based on media data (Step S112). For example, the media content information may be used to search media database 52 for corresponding media content characteristics, e.g., determine media content characteristics. Alternatively, remote sever 16 may transmit the media content information to broadcast server 14. The broadcast server 14 may search database 40 for media content characteristics corresponding to the received media content information. Broadcast server 14 may transmit the media content characteristics to remote server 16. Remote server 16 may verify the requested media content based at least in part on the media content characteristics, e.g., remote server 16 verifies the requested media content is available based at least in part on the media content characteristics (Step S114). For example, the media content characteristics may indicate whether the requested media content is available for download and/or whether the requested media content exists. If the requested content is not verified, a network administrator may be notified (Step S116).

If the requested media content is verified, remote server 16 may download the verified media content, e.g., download media content corresponding to media data in storage request message (Step S118). In particular, remote server 16 may download the content from broadcast server 14 via network 18 for storage in media database 52, e.g., broadcast server 14 delivers media content to remote server 16. For example, remote server 16 may transmit a download request message to broadcast server 14 indicating remote server 16 requests to download the verified media content from broadcast server 14.

Alternatively, remote server 16 may download content from consumer device 12 such that consumer device 12 acts as a proxy server, e.g., consumer device 12 serves as an intermediary between remote server 16 and broadcast server 14 or another content server. Broadcast server 14 and remote server 16 may obtain media content from other Internet connected devices, community antenna cable television systems (CATV), satellite-based systems, and the like. In other words, it is contemplated that servers 14 and 16 have access to media content that is requested by the consumer. Remote server 16 may store the downloaded media content in media database 52 for a length of time determined from the media data, e.g., media data indicates the length of time to store the media content (Step S120). Also, remote server 16 may tag the downloaded content to the consumer. For example, the tag may link the downloaded content to the specific consumer account that requested the downloaded content.

Remote server 12 may transmit a confirmation message to consumer device 12 indicating the content corresponding to the storage request message has been stored in media database 52 (Step S122). The confirmation message may include confirmation data indicating the length of time the media content is to be stored, size of stored media content, cost amount, cost reduction, consumer account number, among other data.

Referring back to Step S106, if the request message is determined not to be a storage request message, remote server 16 determines whether the request message is a content request message (Step S124). In particular, the content request message may include content request data indicating that the consumer wants to stream or download media content to consumer device 12. For example, the content request message data may include the media content title, a triggered message flag, consumer account number, mobile identification number, among other data that may be used by remote server 16 to identify the requested content. Remote server 16 may search media database 52 for stored media content corresponding to the content request message (Step S126). In particular, the requested media content may include media content previously stored in response to a storage request message, other stored media content not linked (e.g., tagged) to the requesting consumer, among other media content. For example, remote server 16 may store media content other consumers have requested and may also store premium content such as new programming, pay-per view events, and the like. In other words, consumer device 12 may transmit a content request message corresponding to any content stored on media database 52, absent predefined media restrictions set by the network administrator or account administrator.

If no corresponding media content is found in media database 52 (Step S128), a network administrator and/or the consumer may be notified (Step S116). Alternatively, if no corresponding media content is found, the content request message may be processed as a storage request message. For example, the content request message may be processed according to the storage request message Steps of S108-S122. Continuing the example, after transmitting the confirmation message (Step S122), the content request message may then be processed as a content request message, e.g., according to Steps S124-S130. If remote server 16 finds the stored media content corresponding to the content request message in media database 52 (Step S128), the corresponding media content may be transmitted to consumer device 12 for display (Step S130). For example, consumer device 12 may stream media content such as digital video from remote server 16 and/or may download the requested content.

Figure 3:
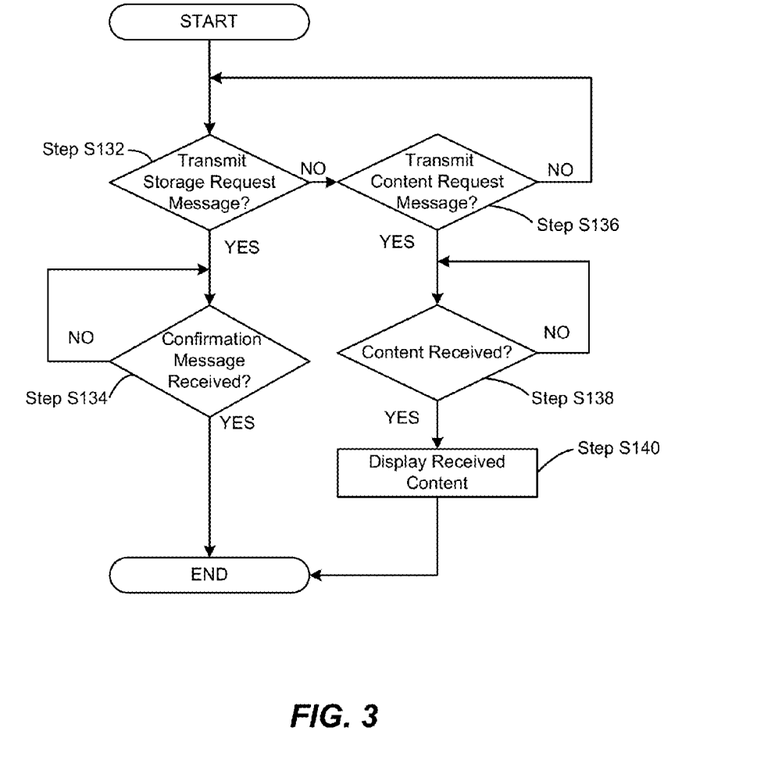
FIG. 3 is a flow chart of an exemplary process for initiating media content storage and streaming.

An exemplary process for consumer device 12 to initiate media content storage, download and/or streaming is described with reference to FIG. 3. In particular, request module 28 determines whether the consumer is requesting to store media content, e.g., whether to transmit a storage request message (Step S132). The determination may be based on a triggering event on consumer device 12 that is initiated by the consumer. For example, the triggering event may be pushing a record/storage button, voice activated record button, selecting media from a media database, among other types of triggering events that cause consumer device 12 to transmit a storage request message. If the storage request message is transmitted via transmitter 20, a determination is made as to whether a confirmation message is received (Step S134). If no confirmation message has been received, the determination of Step S134 is made again. Alternatively, a network administrator and/or consumer may be notified that no confirmation message has been received (not shown). A received confirmation message indicates the transmitted storage request message was successfully received and processed at remote server 16 such that media content corresponding to the storage request message is stored in media database 52. The confirmation may also include information for display at consumer device 12 such as receipt, cost amount, among other displayable data.

Referring back to Step S132, if the determination is made not to transmit a storage request message, a determination is made as to whether to transmit a content request message (Step S136). In particular, the determination of Step S136 is made based on a triggering event on consumer device 12 caused by the consumer. For example, the triggering event may be pushing a content request button, voice activated content button, among other types of triggering events that cause the consumer device 12 to transmit the content request message. If the content request message is transmitted via transmitter 20, a determination is made as to whether the requested media content has been received, e.g., whether the consumer device is storing or downloading the requested media content (Step S138). If the requested media content has not been received, the determination of Step S138 is made again. Alternatively, the network administrator and/or consumer may be notified that the requested content has not been received. If it is determined that the requested media content has been received, the received media content is played on consumer device 12 (Step S140), e.g., digital video is displayed on the consumer device display.

Figure 4:
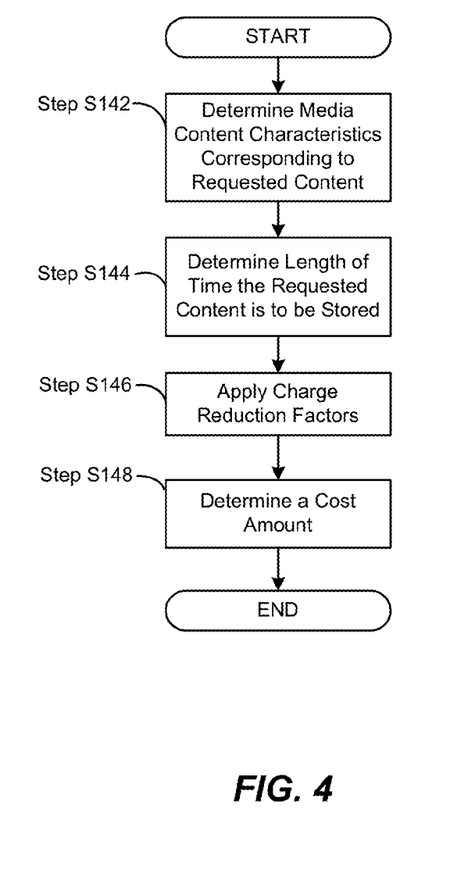
FIG. 4 is a flow chart of an exemplary process for determining a cost amount for storing media content.

An exemplary process for determining a cost amount to store media content is described with reference to FIG. 4. The length of time corresponding to the playback duration of the requested media content that is to be stored in media database 52 is determined, e.g., determine media content characteristics corresponding to requested content (Step S142). For example, the requested media content may correspond to three hours of runtime/playback time, 30 minutes of playback time, etc. The playback time of the media content may be provided by the broadcast server 14 and/or another internet connected device, e.g., the broadcast company may provide the runtime of a movie, among other movie data. A determination is made as to the length of time the requested content is to be stored in media database 52 (Step S144). The consumer may indicate in the storage request message that the requested media content is to be stored for a particular period of time such as two months, one day, or any other specified period of time.

Also, cost reduction factors may be applied to reduce the cost amount for storing media content (Step S146). The cost reduction factors may include a predefined period factor that indicates specific cost reductions based on predefined periods of time a consumer wants to store content. A cost reduction may be applied when a consumer selects media content storage according to set periods of time defined by the server provider. For example, the consumer may choose to store media content for one week or one month as predefined by the service provider. The cost reduction factor may be predefined based on the selected predefined storage times. Continuing the example, certain media content may have a predefined length of storage time of one day such that the media content is available to the consumer for one day and a specific cost reduction will be applied.

The cost amount may be based on factors such as the determined amount of playback time corresponding to the media content (e.g., based on media content characteristics), the length of time the consumer wants to store the requested content in the media database 52 and/or the cost reduction factors (Step S148). The consumer may not incur addition cost for streaming the stored content to consumer device 12 such that the consumer may stream as many times and as much content at a time as he or she, e.g., the determined cost amount is unaffected by the number of times the media content is downloaded or streamed. For example, the consumer may have requested the storage of two particular shows (media content) for one month storage in which the cost amount may be based on the runtime of both shows and the one month storage time and/or cost reduction factors. Continuing the example, the consumer may stream both shows individually or at substantially the same time to consumer device 12 without additional cost. Also, the consumer may stream one or both shows at substantially the same time to several consumer devices 12 registered to a specific consumer, i.e., consumer devices are registered to a single consumer account. Alternatively, additional cost may be incurred for repeated playback, even if the playback occurs during the storage time duration, e.g., playback during the one month storage time.

Figure 5:
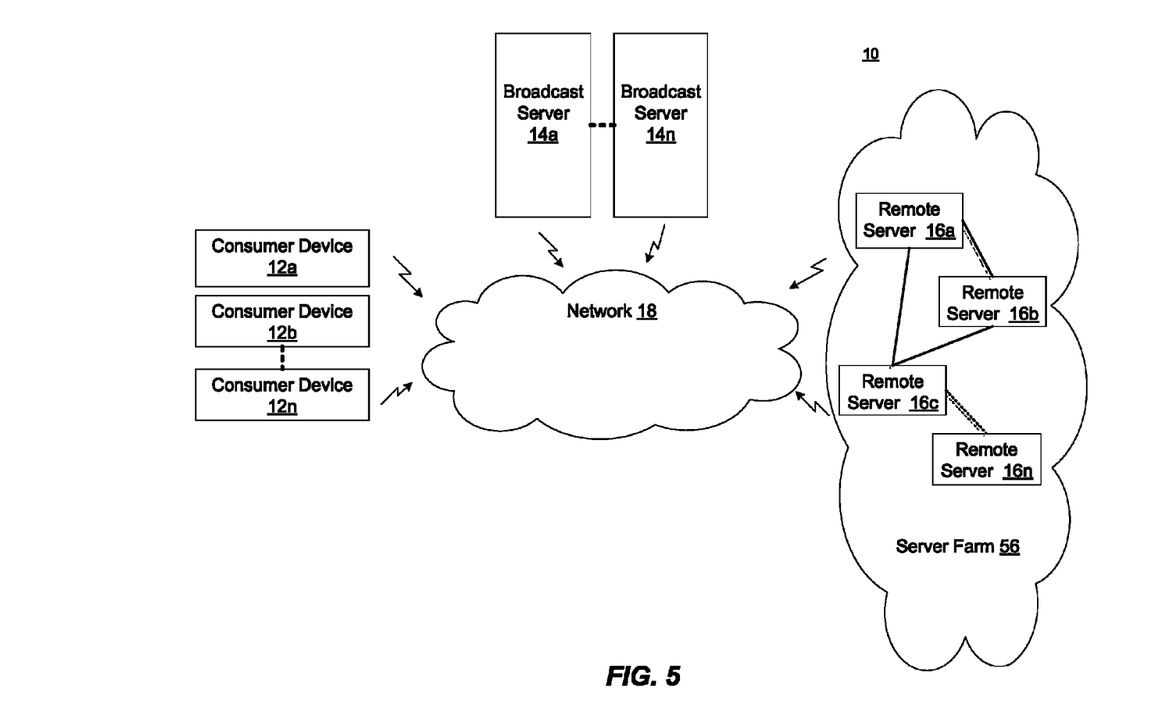
FIG. 5 is a block diagram of media content storage for on-demand delivery constructed in accordance with the principles of the present invention.

Another embodiment of an exemplary storage and delivery system is described with reference to FIG. 5. Server farm 56 may include one or more remote servers 16 that communicate with broadcast server 14, consumer device 12, and other network devices. Server farm 56 may store all media content that is available irrespective of whether the content is being requested by consumer device 12, e.g. stores all media available from broadcast server 14 and other media content sources. In one embodiment, server farm 56 stores all available broadcast and movie content.

Server farm 56 may periodically check for available content that is not already stored in server farm 56. For example, server farm 56 may check or interrogate broadcast server 14 for new content that is available and has not already been downloaded to server farm 56 as discussed in detail in FIG. 6. Alternatively, server farm 56 may receive a content advisory message from broadcast server 14 or other media content sources. The content advisory message may indicate to server farm 56 that media content that is available and may not have been downloaded to server farm 56. In response to the content advisory message, server farm 56 may download the content corresponding to the content advisory message as discussed in detail in FIG. 7. Accordingly, server farm 56 remains updated with all available content such that requested content is already stored in server farm 56 and is ready for delivery, e.g., download, to consumer device 12, as is discussed with respect to FIGS. 6-7.

Figure 6:
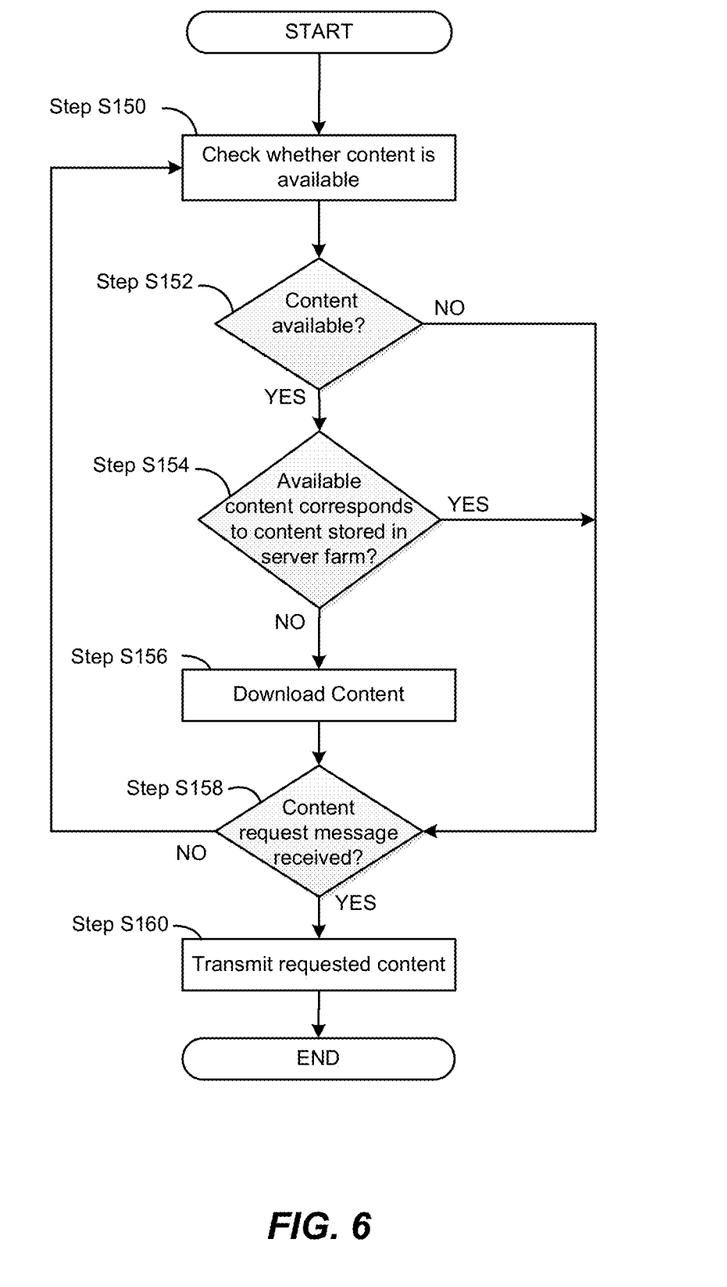
FIG. 6 is a flow chart of an exemplary process for storing and delivering content.

An exemplary process for storing and delivering media content is described with reference to FIG. 6. Server farm 56 checks whether media content is available, e.g., determines if content is available (Step S150). Remote server 16 in server farm 56 checks or interrogates broadcast server 14 for media content not already stored in server farm 56. For example, the media content may be newly released content or content just made available. If media content is available (Step S152), a determination is made whether the available content corresponds to content already stored in server farm (Step S154). For example, remote server 16 determines whether the available content is already stored in server farm 56, e.g. determines if available content is not stored. If the available content is already stored in server farm 56, remote server 16 in server farm 56 determines whether a content request message is received (Step S158). If the available content is not stored in server farm 56, the available content is downloaded and stored in server farm 56 (Step S156). For example, remote server 16 in server farm 56 may initiate download of the available media content from broadcast server 14. After the available content is downloaded to remote server 16 in server farm 56, a determination is made whether a content request message is received (Step S158). For example, consumer device 12 may be requesting specific media content from server farm 56 via a content request message.

Server farm 56 may transmit the requested media content to the requesting consumer device 12, e.g., the available content is downloaded and stored in server farm 56 before the content request message is received such that requested content is ready for delivery (Step S160). The downloaded and stored available content includes at least the requested content. Remote server 16 in server farm 56 may transmit the requested content to consumer device 12. Referring back to Step S152, if content is not available the determination of Step S158 may be made.

Figure 7:
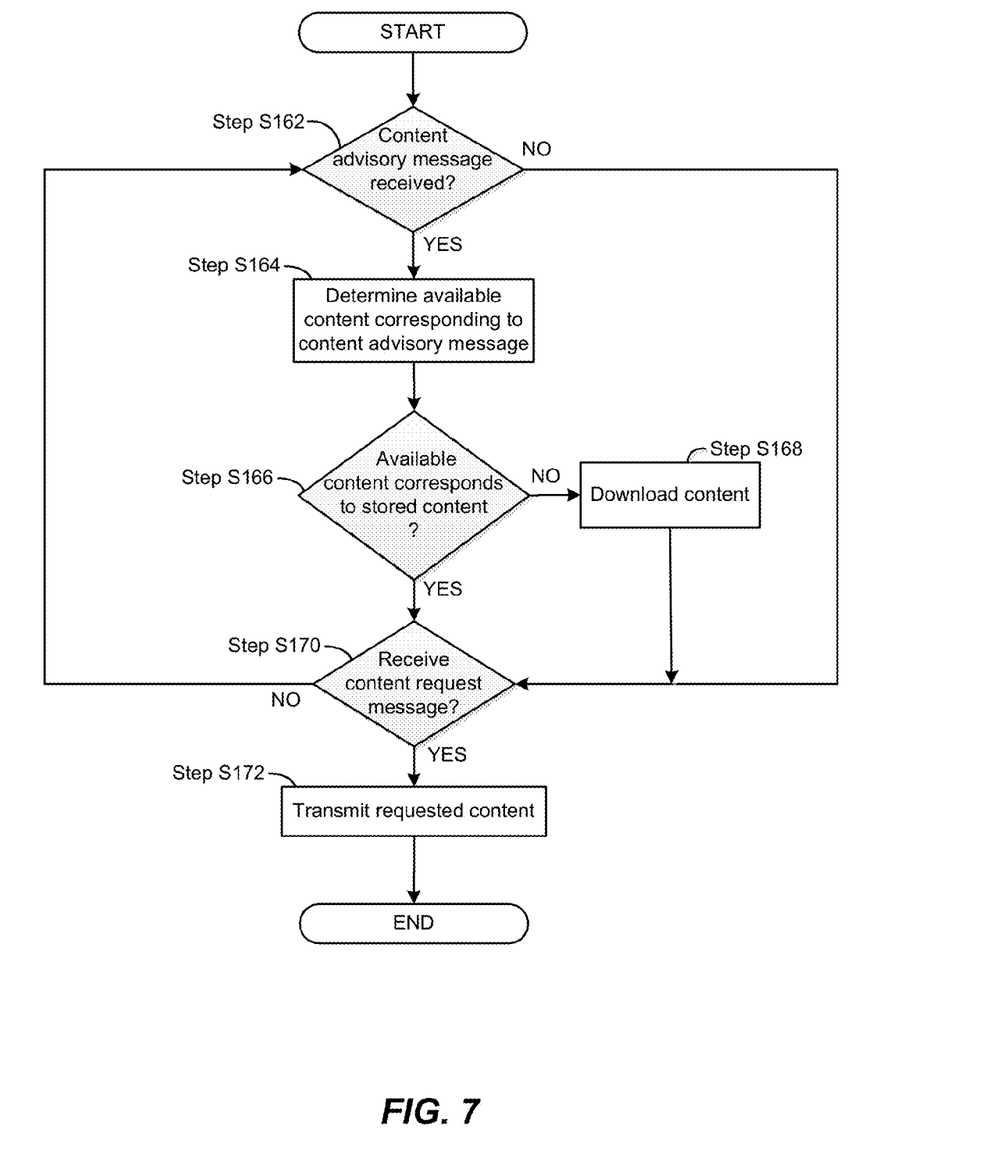
FIG. 7 is a flow chart of an exemplary process for storing and delivering content.

An exemplary process for storing and delivering content is described with reference to FIG. 7. A determination is made whether a content advisory message is received (Step S162). For example, broadcast server 14 or other content providers may send a content advisory message to server farm 56 indicating that content is available. If no content advisory message has been received, remote server 16 in server farm 56 determine if a content request message has been received (Step S170). If the content advisory message is determined to have been received, the content corresponding to the content advisory message is determined (Step S164). Server farm 56 determines whether the available content corresponds to content already stored in server farm, e.g., determines whether content is store or not stored (Step S166). For example, remote server 16 determines whether the available content has previously been downloaded to one of the remote servers 16 in server farm 56. If the available content does not correspond to content stored in server farm 56, the available content is downloaded and stored in server farm 56 (Step S168). For example, remote server 16 in server farm 56 may initiate download of the available media content from broadcast server 14. If the available content is already stored in server farm 56, a determination is made whether a content request message has been received (Step S170). For example, the content request message may be received from consumer device 12 that is requesting to download specific media content from server farm 56. If a content request message is determined not to have been received, the determination of Step S162 may be repeated. If it is determined that a content request message is received, the media content corresponding to the content request message is transmitted, e.g., transmitted to consumer device 12 that requested the content (Step S172). For example, the available content is downloaded and stored in server farm 56 before the content request message is received in which the content request message correspond to previously downloaded content. It is also contemplated that a user can be charged a fee for downloading the content. The fee can be based on one or more factors, e.g., the duration of the media content, the age of the media content, the popularity of the media content and/or the type of media content.

The present invention can be realized in hardware, software, or a combination of hardware and software. Any kind of computing system, or other apparatus adapted for carrying out the methods described herein, is suited to perform the functions described herein. A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system for media content storage and delivery, the system comprising:
   a first server, the first server including:
      a first receiver, the first receiver configured to receive a request message including media data indicating requested media content and a consumer device identifier corresponding to a consumer device; and
      a first processor in communication with the first receiver, the first processor configured to determine whether the consumer device identifier corresponds to a registered consumer device;
   if the first processor determines that the consumer device identifier corresponds to the registered consumer device, then: the first processor is further configured to determine whether the request message is one of a storage request message and a content request message;
      if the request message is the storage request message, then the processor is further configured to determine whether the requested media content is available for storage; and
      if the request message is the content request message, then the processor is further configure to initiate delivery of the requested media content to the consumer device;

wherein the media data includes time data that indicates a length of time to store the requested media content; and the first processor is further configured to determine whether the requested media content exists; and if the processor determines that the requested media content exists, the processor is further configured to determine whether the requested media content is available and whether there are restrictions associated with the requested media content that prevent the requested media content from being delivered to the consumer device.

2. The system of claim 1, wherein the first receiver is further configured to receive a storage confirmation message indicating the requested media content is available for storage.

3. The system of claim 1, wherein if the first processor determines that the consumer device identifier does not correspond to the registered consumer device, then:

the first processor is configured to send a registration message prompting registration of the consumer device.

4. The system of claim 1, wherein the first server further includes a first memory in communication with the first receiver and the first processor, the first memory configured to store user data corresponding to an end user media consumer associated with the consumer device, the user data including a number of consumer devices registered to the end user media consumer.

5. The system of claim 1, wherein the first processor is further configured to verify that the consumer device identifier is associated with an end user media consumer.

6. The system of claim 1, further comprising a second server, the second server including:

a second memory, the second memory configured to store the requested media content;

a second receiver, the second receiver configured to receive a delivery message indicating the requested media content is to be delivered to the first server; and a second transmitter, the second transmitter configured to transmit the requested media content to the first server when the first processor determines that the consumer device identifier corresponds to the registered consumer device.

7. A method for storing media content and delivering requested media content to a consumer device, the method comprising:

receiving a request message including media data indicating requested media content and a consumer device identifier corresponding to the consumer device;

determining whether the consumer device identifier corresponds to a registered consumer device; and if it is determined that the consumer device identifier corresponds to the registered consumer device, then:

determining, whether the request message is one of a storage request message and a content request message; and if the request message is the storage request message, then determining whether the requested media content is available for storage; and if the request message is the content request message, then initiating delivery of the requested media content to the consumer device;

wherein the media data includes time data that indicates a length of time to store the requested media content; and the first processor is further configured to determine whether the requested media content exists; and if the processor determines that the requested media content exists, the processor is further configured to determine whether the requested media content is available and whether there are restrictions associated with the requested media content that prevent the requested media content from being delivered to the consumer device.

8. The method of claim 7, further comprising receiving a storage confirmation message indicating whether the requested media content is available for storage.

9. The method of claim 7, further comprising:

if it is determined that the consumer device identifier does not correspond to the registered consumer device, then:

sending a registration message prompting registration of the consumer device.

10. The method of claim 7, further comprising:

storing user data corresponding to an end user media consumer associated with the consumer device, the user data including a number of consumer devices registered to the end user media consumer.

11. The method of claim 7, further comprising: verifying that the consumer device identifier is associated with an end user media consumer.

12. The method of claim 7, wherein in response to receiving the content request message, the method further comprises transmitting a financial cost of delivering the requested media content.

13. The method of claim 12, wherein the financial cost is unaffected by the number of times the requested media content is delivered.

* * * * *